US005596648A

United States Patent [19]

Fast

[11] Patent Number: 5,596,648

[45] Date of Patent: Jan. 21, 1997

[54] INFRARED AUDIO TRANSMITTER SYSTEM

[76] Inventor: Lawrence R. Fast, 498 Long Hill Rd., Gillette, N.J. 07933

[21] Appl. No.: 366,951

[22] Filed: Dec. 29, 1994

Related U.S. Application Data

[63] Continuation of Ser. No. 224,348, Apr. 7, 1994.

[51] Int. Cl.$^6$ .................... H04B 3/00; H04B 10/00; H04B 10/04

[52] U.S. Cl. .................... 381/77; 359/180; 359/142; 359/149

[58] Field of Search .................... 381/25, 77, 92, 381/155, 79; 359/142, 146, 149, 150, 152, 180, 181, 157, 172

[56] References Cited

U.S. PATENT DOCUMENTS

| | | | |
|---|---|---|---|
| 4,727,600 | 2/1988 | Avakian | 455/601 |
| 4,831,656 | 5/1989 | Southern et al. | 381/169 |
| 5,214,422 | 5/1993 | Cullimore | 359/146 |
| 5,359,448 | 10/1994 | Laszlo et al. | 359/180 |

FOREIGN PATENT DOCUMENTS

| | | | |
|---|---|---|---|
| 2623527A1 | 12/1977 | Germany | H04B 9/00 |
| 2707743A1 | 8/1978 | Germany | H03K 17/00 |
| 3036567A1 | 4/1982 | Germany | H03J 9/06 |
| 3127669A1 | 1/1983 | Germany | H04B 9/00 |
| 3518667A1 | 11/1986 | Germany | H04B 9/00 |
| 3517819A1 | 11/1986 | Germany | H04B 1/59 |
| 3519494A1 | 12/1986 | Germany | H04B 1/68 |
| 0105540 | 5/1988 | Japan | 359/172 |

OTHER PUBLICATIONS

Auditel Product Information, Model EP151/301/601 Infra--Red Emitter Panels, undated.

Auditel Product Information, Model IRX–1/2H Single Channel IR Receiver, undated.

PhonicEar Brochure, Starsound Infrared Hearing Assistance System, System Description and Installation, 1994.

Sennheiser's Infrared Systems Brochure, undated.

Ultra*Phonic Product Information, Model UPC–1/UPC–2, Infrared Headphone Transmission System, undated.

Pressure Zone Microphone (PZM–11) Specifications, Crown International, Inc., Apr. 1991.

High–Power GaAlAs Illuminator, Model OD–666 Specifications, Opto Diode Corp., Undated.

High–Power GaAlAs T–13/4 IR Emitters, Model OD–8810, OD–8811 Specifications, Opto Diode Corp., undated.

Product Bulletin, Model Nady IR–310, Nady Systems, Inc., Mar. 1993.

"Architect's and Consultants' Guide," Sennheiser Electronics Corp., Sep. 1993.

Sennheiser's Infrared Systems Brochure, Feb. 1993.

Product Brochure and Specifications, Audex Model ICON–TT–1 Table Top Conference Emitter System, Audex Assistive Listening Systems, Inc., undated.

"Infrared Systems For Wireless Stereo," *Popular Electronics,* Oct. 1977, pp. 70, 76–78.

*Primary Examiner*—Edward L. Coles, Sr.
*Assistant Examiner*—Jerome Grant, II
*Attorney, Agent, or Firm*—De LaRosa & De LaRosa

[57] ABSTRACT

An infrared assistive listening system capable of enhanced performance in medium-sized locations, such as courtrooms, classrooms, and conference rooms, is realized by a system comprising a pressure zone microphone capable of picking up distant speakers, a high-gain pre-amplifier, an equalization and pre-emphasis circuit, an automatic gain control and limiting circuit, a mute feature capable of remote activation, a FM modulator, a pulse width modulator, and a high-power single front throw infrared emitter. Another embodiment of the invention employs an multi-directional infrared emitter array in conjunction with the single front throw emitter.

20 Claims, 7 Drawing Sheets

INFRARED AUDIO TRANSMITTER SYSTEM

CROSS-REFERENCE TO RELATED APPLICATION

This is a continuation of U.S. patent application Ser. No. 08/224,348, entitled "Infrared Audio Transmitter System," filed on Apr. 7, 1994, which is incorporated herein by reference.

TECHNICAL FIELD

The present invention relates to infrared assistive listening systems and more particularly, infrared assistive listening systems intended for use in medium-sized locations, such as courtrooms, classrooms, conference rooms and the like.

BACKGROUND OF THE INVENTION

The Americans With Disabilities Act of 1990 ("ADA") requires many public places to provide assistive listening systems for use by hearing impaired individuals. Assistive listening systems transmit audio through an alternative medium to individuals equipped with appropriate receivers so as to permit those individuals to hear the audio at a sufficient volume to compensate for some hearing disability. According to figures from the National Technical Institute for the Deaf in Rochester, N.Y., of the 25 million hearing impaired persons in the United States, only two million are profoundly deal Many of the remaining 23 million could benefit from the use of assistive listening devices.

The use of infrared light to transmit a frequency modulated pulse wave has become a popular method for transmitting audio from assistive listening systems. Although experiments in data communication using light radiation can be traced back to Alexander Graham Bell in 1880, infrared communication did not become commercially possible until the development of infrared light emitting diodes ("LEDs") in 1963. Since then, infrared technology has proven to be an efficient and economical method of audio transmission and, unlike radio-based technologies, offers security from unwanted eavesdropping and permits multiple systems within the same building to operate on a single standard frequency.

Most infrared assistive listening systems operate on the same general principle. Audio is taken from its source, converted to a frequency-modulated pulse wave, transmitted as light radiation by infrared LED emitters, and is ultimately received by a headset receiver that converts the light radiation back to audio to be delivered to the listener's ear.

Infrared assistive listening systems for home use or for commercial theatrical use have been available on the market for some time, but systems compatible for medium-sized locations, such as courtrooms, classrooms, conference rooms and the like, have been largely non-existent. It is precisely these locations, however, that must be equipped with assistive listening systems to secure compliance with the ADA.

Theatrical systems are not appropriate for most medium-sized locations. Theatrical systems tend to be bulky, non-portable, and expensive. In addition, they are usually configured to service audience seating, and perform poorly in locations structured "in the round", such as conference rooms.

At the other extreme, small systems for home use are also incapable of satisfactorily servicing medium-sized locations. These systems are normally designed to serve as wireless headphones for television or home stereo listening. They usually do not have a microphone capability and, more importantly, only provide coverage within about a fifteen by eight foot range, the typical area of a living room.

A few manufacturers have, however, introduced infrared assistive listening systems targeted for installation in medium-sized locations. These systems unfortunately suffer from several serious deficiencies. For example, these systems only provide suitable audio coverage within twenty-five feet or less, a range too limited for most classrooms or courtrooms.

In addition, these current systems do not address the special needs for uses intended for medium-sized locations. Unlike, home or theater applications, where the audio is usually from a fixed source, infrared assistive listening systems for use in medium-sized locations must be able to accommodate the dynamic interplay of a variety of speakers situated in many different parts of the room. Current medium-sized systems, however, do not adequately pick up distant speakers over competing noise sources, such as air conditioners or traffic rumble. Nor do they adequately compensate for the wide range in volume levels present in the conference or classroom setting.

Also, the continuous transmission aspect of current medium-sized systems is problematic. Situations often arise, for example, in conferences or trials, where a subset of speakers wish to speak privately. To accommodate such situations, today's medium-sized systems require a full power shutdown.

SUMMARY OF THE INVENTION

An object of the present invention is an infrared assistive listening system for the hearing impaired well suited for medium-sized locations.

A further object of the present invention is an infrared assistive listening system that can reliably pick-up and transmit voices and other desired sounds from both near and distant locations in the area of operation, while suppressing undesired background sounds.

Another object of the present invention is an infrared assistive listening system capable of amplifying soft sounds to comfortable listening levels, while reproducing loud sounds without overload distortion.

A still further object of the present invention is a low-power infrared assistive listening system that can feasibly be battery-powered, while maintaining a sufficient power output for reliable transmission.

These and other objects are achieved by an infrared assistive listening system comprising a high-quality microphone capable of picking up distant speakers, a high-gain pre-amplifier, an equalization and pre-emphasis circuit, an automatic gain control and limiting circuit, a mute feature capable of remote activation, a 95 kHz FM modulation oscillator, a pulse width modulator, and a high-power single from throw infrared LED emitter. Another embodiment of the invention incorporates a 360° multi-directional infrared emitter array in conjunction with the single front throw emitter. This unique arrangement, in addition to providing other advantages, makes it possible to reliably transmit voices from near and distant points in the room, provide enhanced transmission coverage for a medium-sized location in a small, portable unit, and provide the capability of reliable battery operation.

In accordance with one aspect of the invention, a unique combination of a high-quality microphone, equalization circuitry, and automatic gain control and limiting circuitry provides the capability of picking-up voices and other sounds from both near and distant points in the area of operation and reliably transmitting those voices at comfortable listening levels. A commercially available high-quality microphone is employed to enhance the reception of ambient sounds within the room. This microphone is mounted on a large top-plate which, by reflecting incoming sound waves, increases the intelligibility of the resulting audio. Intelligibility is further increased by utilizing an equalization and pre-emphasis circuit. After passing through a high-gain pre-amplifier the audio signal is boosted in the upper speech frequencies while undergoing a low frequency roll-off to eliminate undesired background noises such as air conditioner hum and traffic rumble. A limiting circuit which doubles as an automatic gain control circuit is advantageously employed to boost weak audio signals into a comfortable listening range, and to reduce extremely strong audio signals so as to eliminate the possibility of distortion in the transmitted audio.

In accordance with another aspect of the invention, a single high-power front throw infrared LED emitter is utilized rather than the prior art bank of low-power emitters. This novel design permits an entire medium-sized room to receive coverage, while still maintaining an overall unit size portable enough to be practical for such locations. In another embodiment of the invention, a multi-directional infrared emitter array, consisting of standard low-power LEDs, is used in conjunction with the front throw emitter. This arrangement provides coverage to the rear and sides of the unit, and fills in any dead spots near the front of the unit.

In accordance with another aspect of the invention, an overall low-power design philosophy coupled with an unique power-saving method of driving the infrared LED emitters facilitates battery operation of the invention. As is done in most infrared assistive listening systems, the audio signal is used to frequency modulate a 95 kHz signal. This frequency is the ISO standard carrier frequency for mono infrared audio transmission. However, in the present invention, the resulting composite 50-50 duty cycle square wave is further pulse width modulated to employ narrower pulse widths to drive the infrared emitters. A narrower pulse width permits the proper current to be safely drawn through the infrared LEDs without the use of wasteful current limiting resistors found in previous designs which convert excess current to heat. The result is a substantial saving in power without loss in transmission strength or reliability. In addition, MOSFET, BiFET, and CMOS devices have been selected wherever possible, thereby limiting the power necessary for operation. These features make battery-powered operation of the system a feasible alternative. This is important for operation in older buildings or other areas where AC power is either unreliable or unavailable.

In accordance with another aspect of the invention, a mute function is included which can be activated remotely. The mute function suppresses all audio transmission, thereby permitting sensitive conversations, such as side-bar conferences, to be held in complete privacy.

BRIEF DESCRIPTION OF THE DRAWINGS

A more complete understanding of the invention may be obtained by reading the following description of illustrative embodiments of the invention in which like elements are labeled similarly and in which.

DETAILED DESCRIPTION OF THE INVENTION

Figure 1:
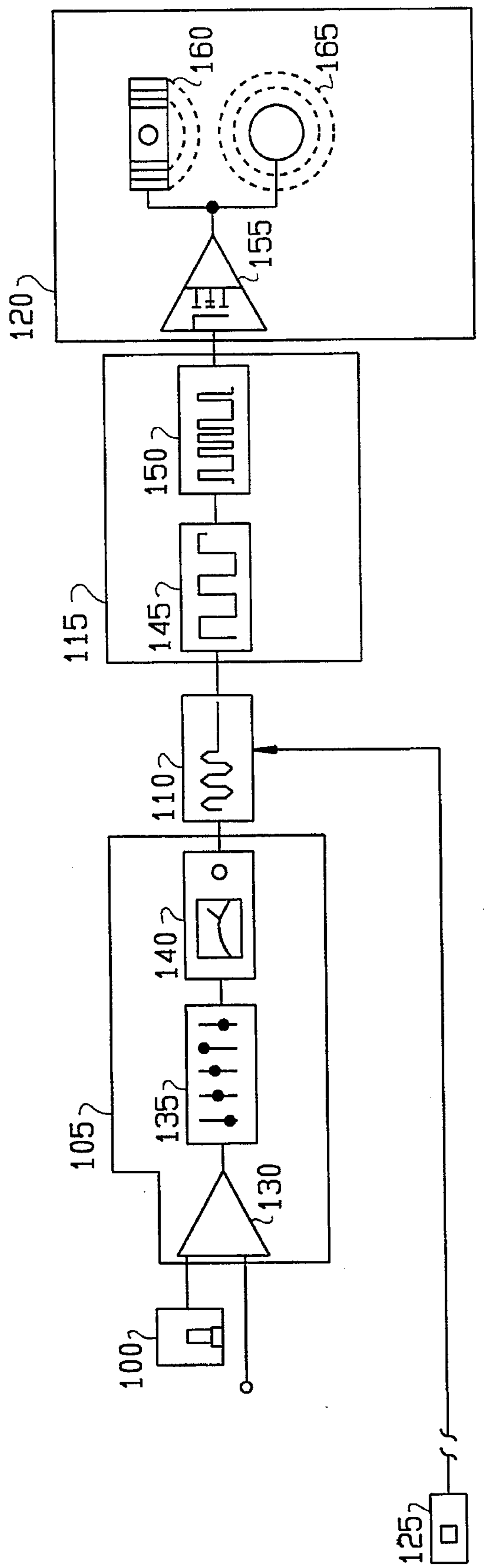
FIG. 1 is a functional block diagram of an embodiment of an infrared assistive listening system in accordance with the present invention.

As shown in the functional block diagram of FIG. 1, the invention comprises a microphone circuit 100, a signal processing stage 105, a modulation stage 115, and an infrared emitter stage 120. A mute circuit 110 is employed to interrupt audio transmission during private conversations. Muting is accomplished through the use of a remote mute control 125.

Signal processing stage 105 comprises a high-gain BiFET pre-amplifier 130 and an equalization and pre-emphasis stage 135. Extremely weak or strong audio signals are adjusted to normal levels by an automatic gain control and limiter circuit 140.

Modulation stage 115 comprises an FM modulation oscillator 145 centered at a frequency of 95 kHz. This is the ISO standard frequency for FM transmission of mono infrared audio signals. The square wave output of oscillator 145 is fed to a pulse width modulator 150 which modifies the output pulse width to calibrate the current flowing through the infrared LED emitters contained in infrared emitter stage 120.

Infrared emitter stage 120 comprises a MOSFET output driver 155 which drives a single 330 mW forward throw infrared emitter 160. In another embodiment of the invention, a 48 mW 360° multi-directional infrared emitter array 165 can be driven simultaneously with forward throw emitter 160.

Figure 2:
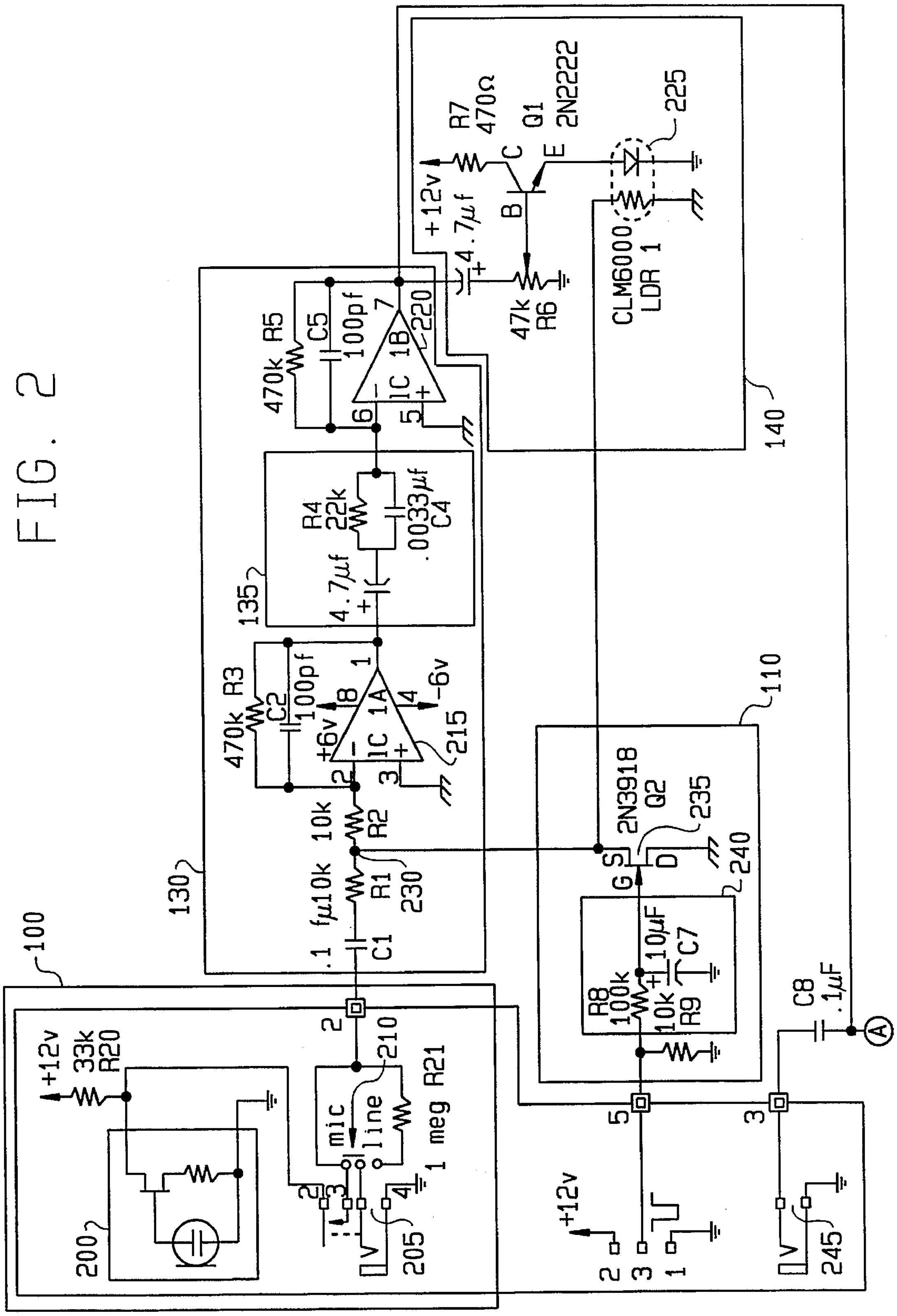
FIG. 2 is a schematic diagram of the microphone and signal processing circuitry used in the infrared assistive listening system of FIG. 1.

The circuitry of microphone 100 is shown in FIG. 2. The system utilizes a commercially available electret microphone capsule 200, preferably a pressure zone microphone designed to pick up distant speakers, such as the PZM-11 manufactured by Crown International, Inc. of Elkart, Indiana. See U.S. Pat. No. 4,361,736, which is incorporated herein by reference. This particular microphone enhances sound quality and intelligibility by reflecting incoming sound waves off a closely-mounted boundary plate. The microphone capsule is phantom powered from a $^{+}12$ volt power supply.

An external input 205 is provided. A commercially available input jack, such as the Type 13 E manufactured by Switchcraft, Inc. is employed. Plugging into the jack causes the signal from on-board microphone 200 to be interrupted and the external input to be passed to a switch 210. A line level external input signal is padded down by 30 db to the appropriate pre-amplifier levels by resistor R21 when switch 210 is in the "LINE" position. When switch 210 is in the "MIC" position no attenuation is applied to an attached external microphone. Jack 205 is wired so that when an external source is removed microphone 200 will reactivate at the correct level regardless of the position of switch 210.

FIG. 2 also shows high-gain BiFET pre-amplifier 130 in greater detail. Pre-amplifier 130 includes two gain stages of BiFET operational amplifier circuitry 215, 220. Equalization and pre-emphasis circuitry 135 is placed between gain stages 215, 220. Equalization and pre-emphasis circuitry 135 rolls-off low frequency audio signals arising from such sources as air conditioners or traffic, and boosts high frequency audio signals thereby enhancing the intelligibility of audio signals within the speech range.

First gain stage 215 is centered around a low-noise BiFET operational amplifier, preferably an LF353, TL072, or TL082 model amplifier. First gain stage 215 amplifies the incoming audio by 25 db. Capacitor C2 limits the high gain to audio frequencies only and compensates for stray RF interference.

The output of first gain stage 215 is DC blocked and given a 50 μs pre-emphasis by equalization and pre-emphasis circuit 135. This pre-emphasis boosts the upper speech frequencies enhancing clarity and compensating for the poor high frequency response found in many commercially available infrared headset receivers. A significant low frequency roll-off is also created which de-emphasizes distracting background sounds such as air-conditioner noise or traffic rumble.

The output signal from equalization and pre-emphasis circuitry 135 is fed into second BiFET gain stage 220. Gain stage 220 is constructed in an similar fashion to first gain stage 215 and also provides a frequency-compensated 25 db gain.

The gain through BiFET pre-amplifier 130 is continuously modified by automatic gain control (AGC) and limiter circuit 140. This circuitry, also shown in FIG. 2, can compensate for audio signals which are either extremely weak or extremely strong by bringing those signals to comfortable listening levels.

In this embodiment of the system, a light dependent resistor opto-isolator 225, such as Model CLM6000 from Calirex, Inc. forms the core of AGC/limiter circuit 140. The output signal from pre-amplifier 130 is DC-blocked and amplified by an NPN transistor Q1. The transistor causes the LED portion of opto-isolator 225 to illuminate creating a variable resistance in the photoresistor portion of opto-isolator 225. As the photoresistor is illuminated, pre-amplifier input node 230 is pulled closer to neutral, reducing the audio level input to pre-amplifier 130. Trimmer R6 is used to adjust the degree of limiting.

Although constructed as a limiter, the circuit, when combined with the pre-amplifier, serves as both a limiter and an automatic gain control. Extremely weak input signals will suffer no limiting and will undergo the entire 50 db of gain (two 25 db cascaded gain stages). As input levels increase, the limiter will reduce the gain. Extremely strong signals will undergo substantial limiting, so that no output distortion will result.

Mute circuit 110 is used to cease audio modulation, without interrupting the FM carrier, during situations where privacy is required. Mute circuit 110 employs a low resistance FET switch 235 which, when active, will pull pre-amplifier input node 230 to neutral suppressing the input audio signal completely. The mute state is activated by a signal from remote mute control 125. An integrator 240 is used to eliminate the loud, popping noises which might be heard by the receivers of the audio transmission if the mute state was allowed to change instantly. Integrator 240 provides a gentle one second fade-in and fade-out as the mute state is toggled. Resistor R9 causes the circuit to remain in the un-mute state when no mute control signal is present.

The pre-amplifier output is provided to an output jack 245. This feature makes the audio available for transcription recording or other purposes.

Figure 3:
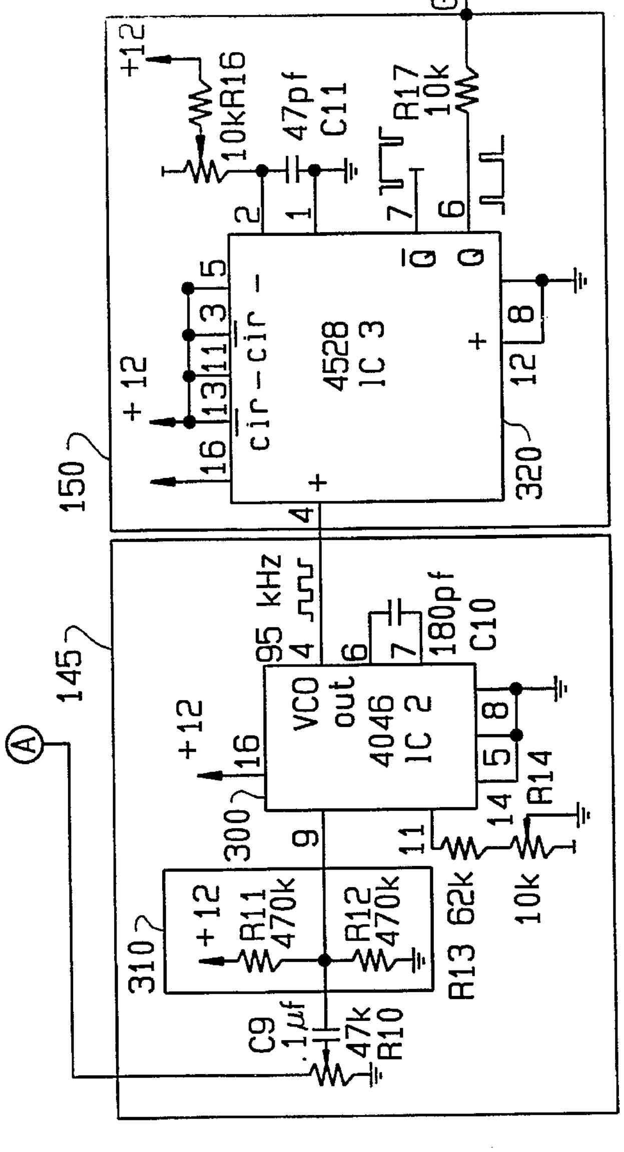
FIG. 3 is a schematic diagram of the modulation circuitry used the infrared assistive listening system of FIG. 1.

FIG. 3 illustrates in greater detail modulation stage 115 and infrared emitter stage 120. FM modulation oscillator 145 is based upon the voltage controlled oscillator section of a CMOS Model 4046 phase locked loop ("PLL") 300. The use of this type of device saves considerable power over other conventional oscillator designs, a feature which is especially important for battery operation.

The output of signal processing stage 105 forms the input to FM modulation oscillator 145 after undergoing level adjustment by trimmer R10. The signal is DC-blocked and fed into the VCO input of phase locked loop 300. A neutral voltage offset is created by a voltage divider 310. This offset is actually $^{+}6$ volts, as PLL 300 is powered by a single $^{+}12$ volt supply. C10 and R13 set the center frequency of the oscillator to 95 kHz, the standard ISO carrier frequency for mono infrared audio transmission. Trimmer R14 provides final adjustment. The output of FM modulation oscillator 145 is a 50-50 square wave centered at 95 kHz modulated +/- 50 Hz by the audio signal.

The square wave output is passed to the trigger input of a CMOS Model 4528 mono-stable multivibrator 320. Capacitor C11, resistor R16, and trimmer R15 determine the mono-stable time constant. In this manner, the square wave input can be recast to the precise pulse width to derive the exact current necessary for the infrared emitters. A narrower pulse width permits a higher instantaneous current through the infrared emitters without harming them and eliminates the need for wasteful current limiting resistors which convert excess current to heat. Narrower pulse widths, therefore, have the desirable effect of considerably reducing the power requirements of the infrared emitter stage.

Figure 4:
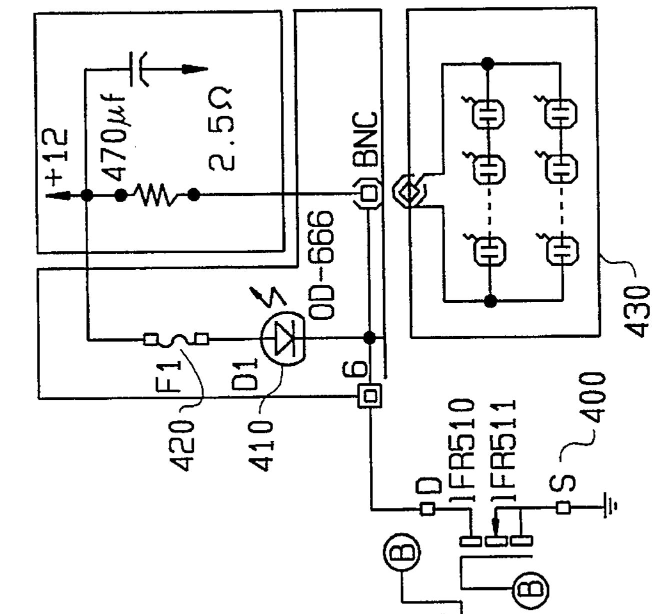
FIG. 4 is a schematic diagram of the infrared emitter circuitry used in the infrared assistive listening system of FIG. 1.

FIG. 4 shows in greater detail the circuitry of infrared emitter stage 120. Output drive is created by a fixed current source switched through a MOSFET power transistor 400. The frequency modulated pulse signal output from modulation stage 115 is presented to the gate of MOSFET power transistor 400 (Q3). This transistor switches the infrared emitters from their source current at the $^{+}12$ volt rail.

The principal infrared emitter is a single front-projecting device 410 capable of a high-power infrared output. This embodiment of the system employs a Model OD-666 High Power GaA1As Illuminator manufactured by Opto Diode Corp. of Newbury Park, Calif. which can deliver a typical total power output of 330 mW. Pulse width modulator 150 is adjusted at R16 to draw about 300 mA through emitter 410. A fast blow fuse (0.5 A) 420 protects the emitter from overcurrent conditions.

Another embodiment of the present invention employs a 360° multi-directional emitter, a circular array of twelve smaller infrared LEDs 430, in addition to single front throw emitter 410. Multi-directional emitter 430 is configured as two parallel strings of six LEDs, each string drawing ~50–60 mA from the $^{+}12$ volt rail. Each LED is a 4 mW emitter, preferably a Model OD-8811 High-Power GaA1As T- 1 ¾ IR Emitter manufactured by Opto Diode Corp. of Newbury Park, Calif., producing a total power output of only 48 mW. This power output is adequate, however, because unlike the prior art, multi-directional emitter array 430 does not serve as the principal emitter platform, but instead augments the performance of single front throw emitter 410 by transmitting to the rear and sides of the unit and filling in any dead spots in the forward transmission.

Figure 5A:
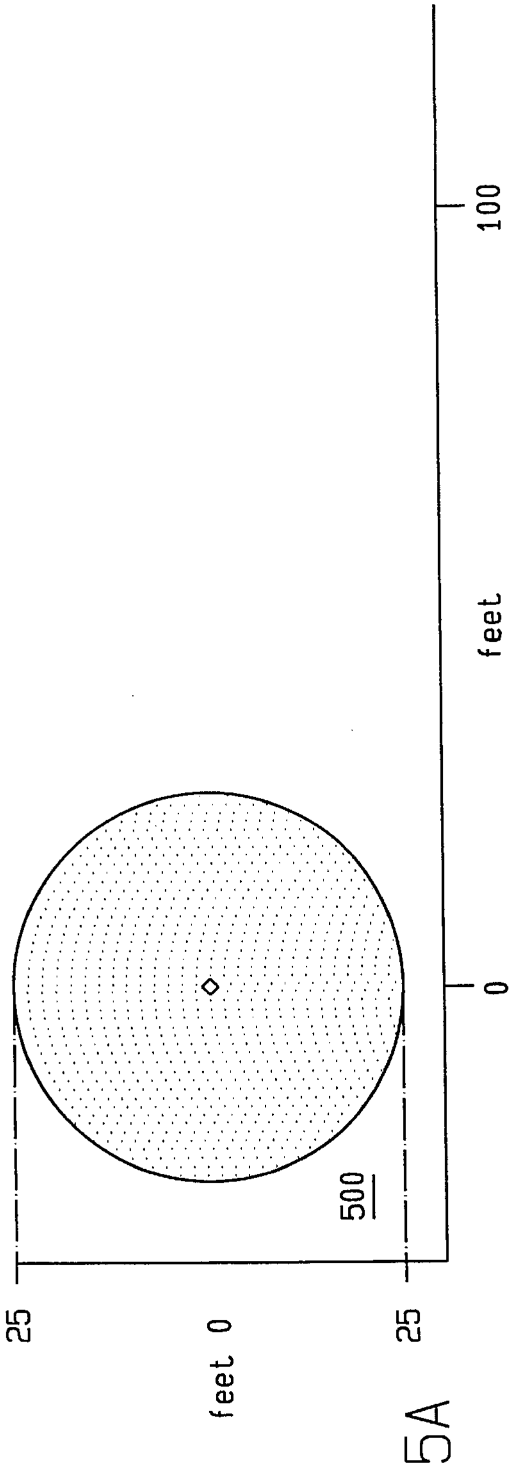
FIG. 5A is a graph illustrating the audio transmission range of commercially available medium-sized systems.
Figure 5B:
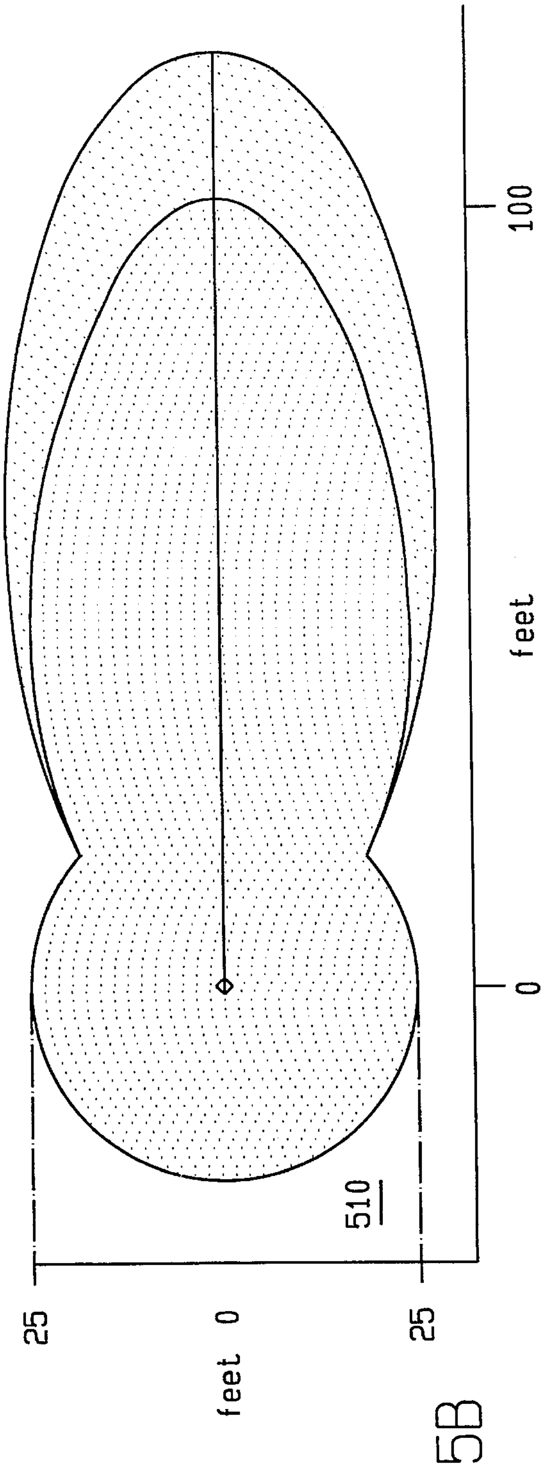
FIG. 5B is a graph illustrating the audio transmission range of the present invention.

The typical range of current mid-sized systems is limited to about a radius of 25 feet or less, as shown by in FIG. 5A. The present invention can cover the same 25 foot radius through the use of multi-directional emitter array 430, but also can achieve a forward coverage of up to 100 feet, as shown by in FIG. 5B. This type of range pattern is ideally suited for medium-sized locations such as classrooms, courtrooms, or conference centers.

Figure 6:
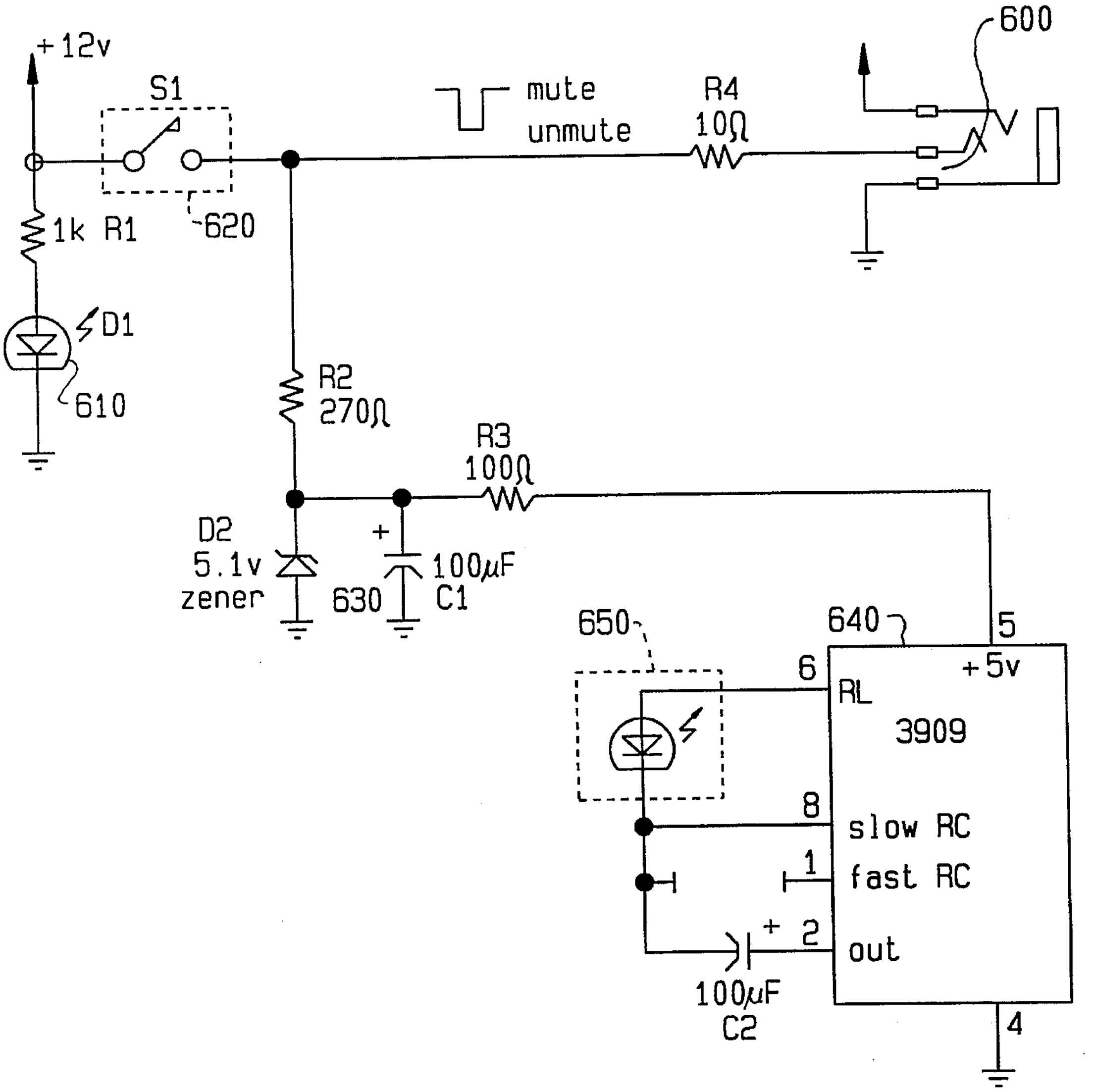
FIG. 6 is a schematic diagram of a remote mute control circuitry used in the infrared assistive listening system of FIG. 1.

FIG. 6 is a schematic representation of remote mute control 125. The remote receives power and returns a control signal through a three-conductor cable connecting to a stereo mini jack 600. A power indicator LED 610 is illuminated off the $^+$12 volt power feed. A locking pushbutton switch 620 (S1) returns a $^+$12 volt control signal when engaged.

The $^+$12 volt control signal is also used to create a $^+$5.1 volt power supply using zener diode 630 (D2). This line powers a Model 3909 low-current flasher device 640, which causes a mute indicator LED 650 to flash while the control signal is active.

Figure 7:
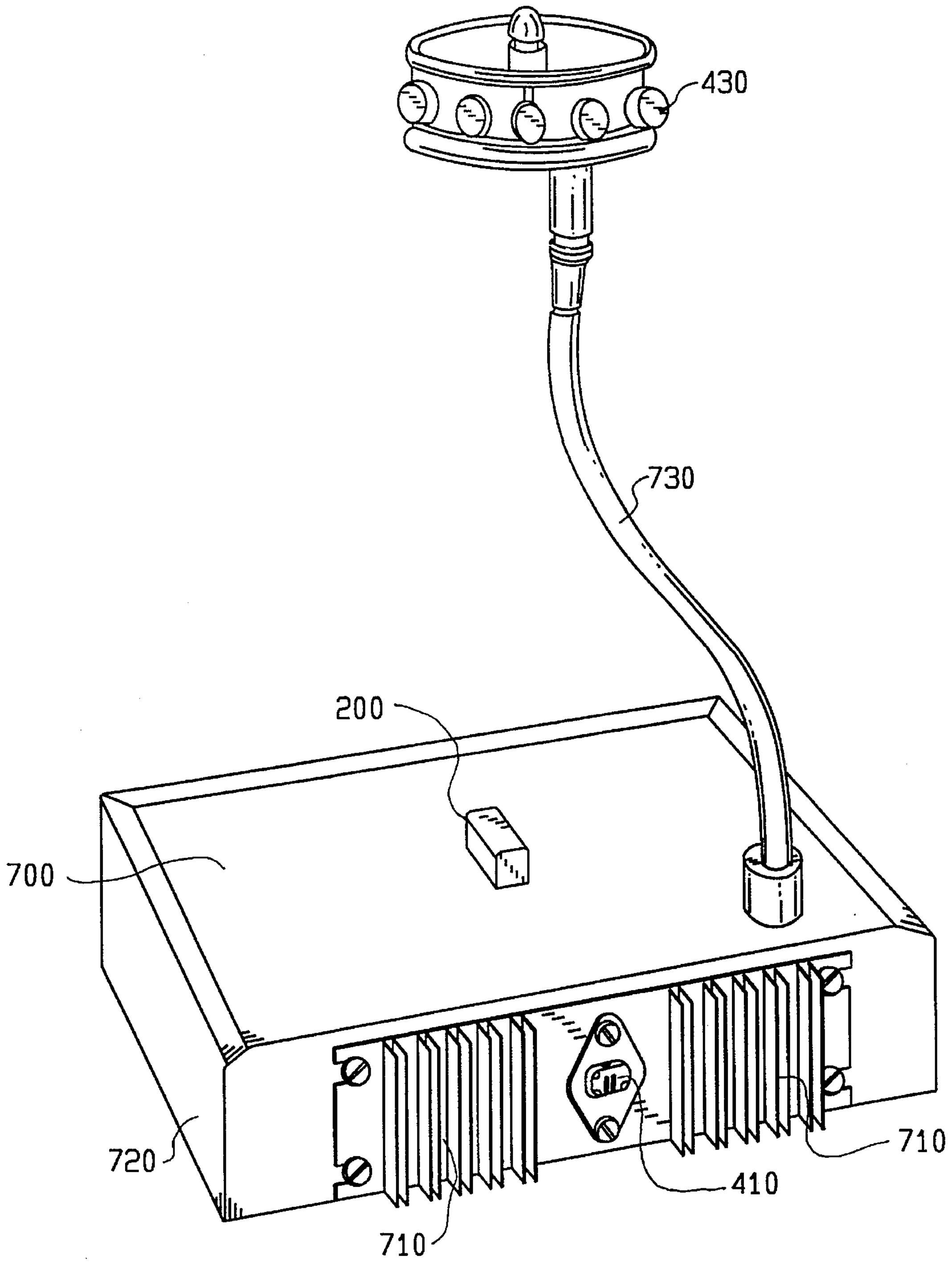
FIG. 7 is a pictorial illustration of a physical embodiment of the infrared assistive listening system of FIG. 1.

FIG. 7 illustrates a possible physical configuration of the present invention. Microphone capsule 200 is mounted on top of the unit. A large top plate 700 of the unit serves as a boundary reflection plate for the microphone, enhancing its pickup characteristics. Single front throw emitter 410 is mounted on the front of the unit on a finned heat sink 710 which can keep the 330 mw device at a temperature only slightly warmer than room temperature. Power switches and external connectors are mounted on the rear of the unit. Entire base 720 can be built to the size of a large paperback book (6.5"×5"×1.5"), making the device easy to transport from room to room.

Multi-directional emitter array 430 is mounted on a gooseneck stalk 730 which is fastened to base unit 720 through a BNC connector. Gooseneck stalk 730 raises the multi-directional emitter array above obstacles, such as books or papers, which may be present on tables or other surfaces where this invention is intended to be used. Gooseneck stalk 730 is flexible allowing the user to place emitter 430 in as ideal a location as possible.

Figure 8:
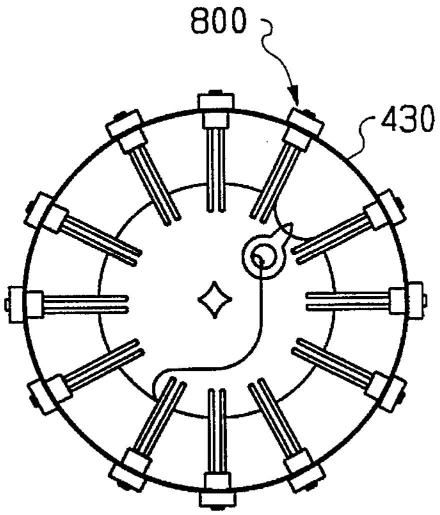
FIG. 8 is a top plan view of a physical embodiment of a multi-directional emitter array.
Figure 9:
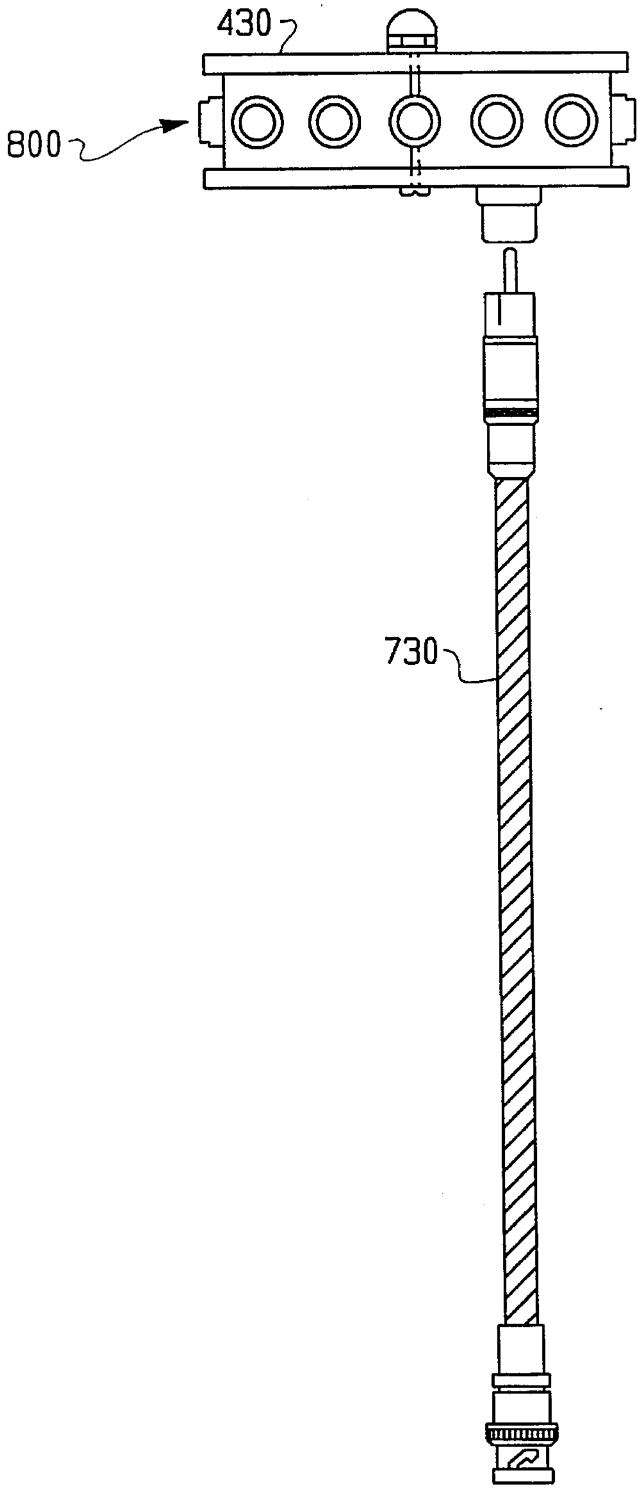
FIG. 9 is a side plan view of the multi-directional emitter array of FIG. 8.

FIGS. 8 and 9 illustrate in greater detail multi-directional emitter array 430. The twelve infrared LEDs are mounted in equidistant position over a 360 degree circumference. The LEDs are mounted in a chrome reflectors 800 to enhance their transmission performance.

It is understood that various modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

I claim:

1. An infrared signal transmitter comprising:

a signal generator;

a housing in which said signal generator is housed;

a mount;

a plurality of infrared transmitting elements disposed on said mount and operatively connected to said signal generator for transmitting infrared signals in a multi-directional pattern, said plurality of infrared transmitting elements including a single front throw emitter for transmitting said infrared signals substantially along a single direction, and a multi-directional emitter for transmitting said infrared signals at least along the rear and sides of said single direction; and means jointly secured to said mount and said housing for extending said mount substantially above said housing so as to allow said transmitting elements to transmit said infrared signals substantially unobstructed to a user.

2. The infrared signal transmitter of claim 1 further comprising:

mating plug-in connector parts on said housing and said mount through which said mount is removably secured to said housing and through which said transmitting elements are operatively connected to said signal generator.

3. The infrared signal transmitter of claim 1 further comprising:

mating plug-in connector parts on said housing and said means for extending through which said mount is removably secured to said housing and through which said transmitting elements are operatively connected to said signal generator.

4. The infrared signal transmitter of claim 3 wherein said mating plug-in connector parts include co-axial connectors.

5. The infrared signal transmitter of claim 4 wherein said co-axial connectors are BNC connectors.

6. The infrared signal transmitter of claim 1 wherein said means for extending is of sufficient mechanical strength to support said mount and operatively connected between said housing and said mount so as to provide an electrical path between said signal generator and said plurality of infrared transmitting elements.

7. The infrared signal transmitter of claim 1 wherein said means for extending is a gooseneck stalk.

8. The infrared signal transmitter of claim 7 wherein said gooseneck stalk is sufficiently flexible so as to allow said transmitting elements to be positioned with respect to said housing.

9. The infrared signal transmitter of claim 1 wherein said multidirectional pattern is a single directional pattern and an omnidirectional pattern.

10. The infrared signal transmitter of claim 1 further comprising:

a microphone permanently affixed within said housing.

11. The infrared signal transmitter of claim 10 wherein said microphone is a pressure zone microphone.

12. The infrared signal transmitter of claim 1 wherein said infrared transmitting elements include a plurality of infrared light emitting diodes housed in said mount along equidistant positions over a 360° degree circumference.

13. The infrared signal transmitter of claim 1 further comprising a chrome reflector, said infrared transmitting elements mounted through said chrome reflector.

14. The infrared signal transmitter of claim 1 further comprising:

a battery in said housing operable to power said signal generator and said infrared transmitting elements.

15. The infrared signal transmitter of claim 1 further comprising:

means for muting said signal generator such that said plurality of infrared transmitting elements transmit an unmodulated carder signal.

16. The infrared signal transmitter of claim 1 wherein said multi-directional emitter includes a circular array of infrared light emitting diodes.

17. The infrared signal transmitter of claim 1 wherein said single throw emitter and said multi-directional emitter transmit infrared signals simultaneously.

18. An infrared signal transmitter comprising:

a signal generator;

a housing in which said signal generator is housed;

a mount;

a single front throw emitter operatively connected to said signal generator for transmitting infrared signals substantially along a single direction; and a multi-directional emitter operatively connected to said signal generator for transmitting infrared signals at least along the rear and sides of said single direction.

19. The infrared signal transmitter of claim 18 further comprising means jointly secured to said mount and said housing for extending said mount substantially above said housing so as to allow said single front throw emitter and said multi-directional emitter to transmit said infrared signals substantially unobstructed to a user.

20. The infrared signal transmitter of claim 18 wherein said mount is removably secured to said housing and through which said single front throw emitter and said multi-directional emitter are operatively connected to said signal generator.

* * * * *